United States Patent
Goyal et al.

(10) Patent No.: US 9,268,855 B2
(45) Date of Patent: Feb. 23, 2016

(54) PROCESSING REQUEST KEYS BASED ON A KEY SIZE SUPPORTED BY UNDERLYING PROCESSING ELEMENTS

(71) Applicant: Cavium, Inc., San Jose, CA (US)

(72) Inventors: Rajan Goyal, Saratoga, CA (US); Kenneth Bullis, Los Altos, CA (US)

(73) Assignee: CAVIUM, INC., San Jose, CA (US)

( * ) Notice: Subject to any disclaimer, the term of this patent is extended or adjusted under 35 U.S.C. 154(b) by 128 days.

(21) Appl. No.: 14/150,550

(22) Filed: Jan. 8, 2014

(65) Prior Publication Data
US 2015/0195262 A1    Jul. 9, 2015

(51) Int. Cl.
*H04L 29/06* (2006.01)
*G06F 17/30* (2006.01)

(52) U.S. Cl.
CPC ...... *G06F 17/30864* (2013.01); *H04L 63/0227* (2013.01)

(58) Field of Classification Search
CPC . H04L 63/02; H04L 63/0227; H04L 63/0245; H04L 63/0263; H04L 63/14; H04L 63/1408; H04L 63/16; G06F 17/309979; G06F 17/30988
See application file for complete search history.

(56) References Cited

U.S. PATENT DOCUMENTS 6,192,051 B1 *   2/2001   Lipman et al. ............... 370/389

* cited by examiner

*Primary Examiner* — Edward Zee
(74) *Attorney, Agent, or Firm* — Lathrop & Gage LLP

(57) ABSTRACT

A packet classification system, methods, and apparatus are provided for packet classification. A processor of a router coupled to a network processes data packets received from a network. The processor creates a request key using information extracted from a packet. The processor splits the request key into an n number of partial request keys if at least one predetermined criterion is met. The processor also sends a non-final request that includes an i-th partial request key to a corresponding search table of an n number of search tables, wherein i<n. Further, the processor receives a non-final search result from the corresponding search table. The processor sends a final request that includes an n-th partial request key and the non-final search result. The processor receives a final search result from the corresponding search table and processing the packet based on processing data included in the final search result.

18 Claims, 19 Drawing Sheets

PROCESSING REQUEST KEYS BASED ON A KEY SIZE SUPPORTED BY UNDERLYING PROCESSING ELEMENTS

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

Embodiments of the present disclosure include methods, systems, apparatus, or computer readable medium, with program codes embodied thereon, for processing data packets. One embodiment is a method that includes receiving a packet. The method also includes creating a request key using information extracted from the packet. In addition, the method includes splitting the request key into an n number of partial request keys if at least one predetermined criterion is met, wherein n>1 and each of the n number of partial request keys is associated with a distinct set of information extracted from the packet. The method also includes sending a non-final request that includes an i-th partial request key to a corresponding search table of an n number of search tables, wherein i<n. Further, the method includes receiving a non-final search result from the corresponding search table. The method include sending a final request that includes an n-th partial request key and the non-final search result received in response to sending the non-final request to the corresponding search table. Also, the method includes receiving a final search result from the corresponding search table and processing the packet based on processing data included in the final search result.

The packet can include at least one header and the information is extracted from at least one data field of the at least one header. The distinct set of information can be extracted from data stored in a set of data fields corresponding to a subset of the at least one data field of the at least one header contained in the packet.

The at least one predetermined criterion can be at least one of: a processing capability of a processing system for processing the request key and a size of the request key. The size of the request key can be based on a size and number of data fields from which the information is extracted. The corresponding search table can be a search table including rules that are modified to be searchable on the set of data fields from which the distinct set of information is extracted from the packet. If 1<i<n, the non-final request includes the i-th partial request key and the non-final search result received in response to sending an (i−1)th non-final request. The non-final search result can include a cookie identifying a set of rules in the corresponding search table that matches the i-th partial request key and a next set of the distinct set of information to be matched in a next non-final request. The final search result can identify a rule that includes instructions used to process the packet.

Another embodiment is an apparatus that includes a memory and one or more processors coupled to the memory. The one or more processors are configured to receive a packet and create a request key using information extracted from the packet. The one or more processors are also configured to split the request key into an n number of partial request keys if at least one predetermined criterion is met, wherein n>1 and each of the n number of partial request keys is associated with a distinct set of information extracted from the packet. In addition, the one or more processors are configured to send a non-final request that includes an i-th partial request key to a corresponding search table of an n number of search tables, wherein i<n. Further, the one or more processors are configured to receive a non-final search result from the corresponding search table. Also, the one or more processors are configured to send a final request that includes an n-th partial request key and the non-final search result received in response to sending a non-final request including an (n−1)th partial request key to the corresponding search table. The one or more processors are also configured to receive a final search result from the corresponding search table and process the packet based on processing data included in the final search result.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure. The accompanying drawings, which are incorporated in and constitute a part of this specification, illustrate several embodiments consistent with the disclosure and together with the description, serve to explain the principles of the disclosure.

DETAILED DESCRIPTION

A description of example embodiments of the invention follows.

The teachings of all patents, published applications and references cited herein are incorporated by reference in their entity.

Although packet classification has been widely studied for a long time, researchers are still motivated to seek novel and efficient packet classification solutions due to: i) the continual growth of network bandwidth, ii) increasing complexity of network applications, and ii) technology innovations of network systems.

Explosion in demand for network bandwidth is generally due to the growth in data traffic. Leading service providers report bandwidths doubling on their backbone networks about every six to nine months. As a consequence, novel packet classification solutions are required to handle the exponentially increasing traffics on both edge and core devices.

Complexities of network applications are increasing due to the increasing number of network applications being implemented in network devices. Packet classification is widely-used for various kinds of applications, such as service-aware routing, intrusion prevention and traffic shaping. Therefore, novel solutions of packet classification must be more intelligent to handle diverse types of rule sets without significant loss of performance.

In addition, new technologies, such as multi-core processors provide unprecedented computing power, as well as highly integrated resources. Thus, novel packet classification solutions must be well suited to advanced hardware and software technologies.

Before describing example embodiments in detail, an example packet classification system and related methods are described immediately below to help the reader understand the inventive features described herein.

Existing packet classification methods trade memory for time. Although the tradeoffs have been constantly improving, the time taken for a reasonable amount of memory is still generally poor. Because of problems with existing methods, vendors use ternary content-addressable memory (TCAM), which uses brute-force parallel hardware to simultaneously check packets against all rules. The main advantages of TCAMs over existing methods are speed and determinism (TCAMs work for all databases).

A TCAM is a hardware device that functions as a fully associative memory. A TCAM cell stores three values: 0, 1, or 'X,' which represents a don't-care bit and operates as a per-cell mask enabling the TCAM to match rules containing wildcards (e.g., don't care bits). In operation, a whole packet header can be presented to a TCAM to determine which entry (rule) it matches. However, the complexity of TCAMs has permitted only small, inflexible, and relatively slow implementations that consume a lot of power. Therefore, a need continues for efficient methods operating on specialized data structures.

Figure 1:
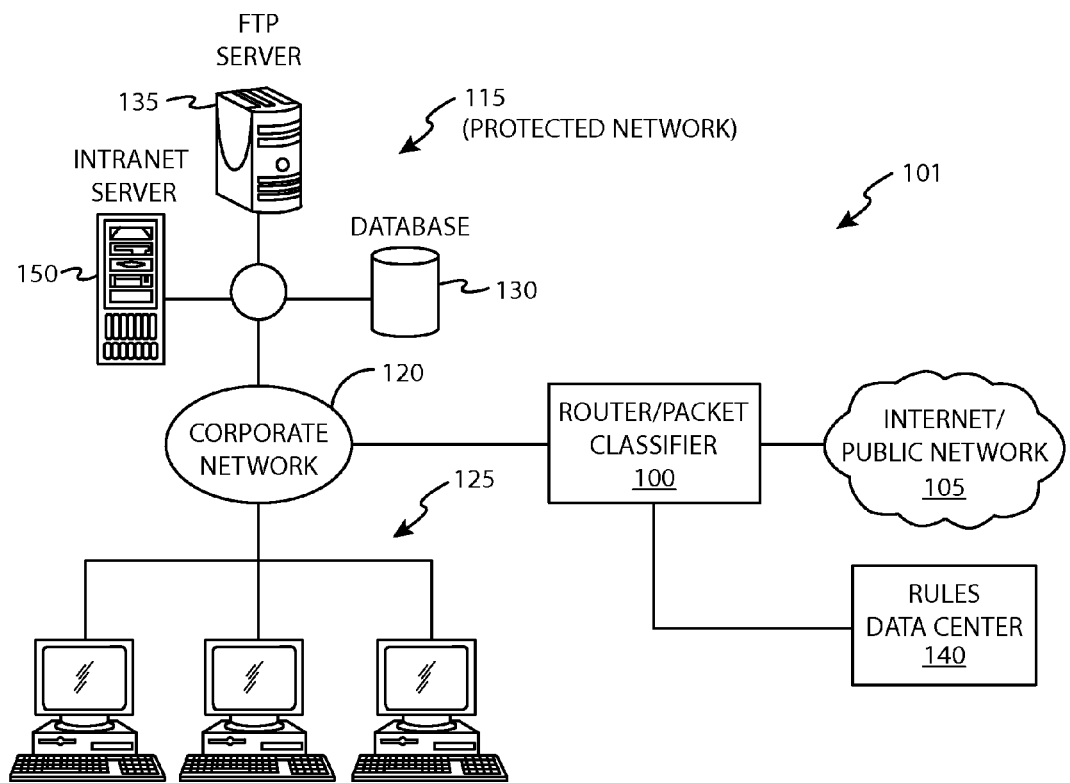
FIG. 1 is a block diagram illustrating a system in which a packet classifier operates to classify packets to provide internet services to a private network, in accordance with an example embodiment of the present disclosure.

FIG. 1 is a block diagram illustrating a system 101 that includes a router/packet classifier 100, protected network 115, and a public network 105 in accordance with an example embodiment of the present disclosure. The public network 105 may comprise an unsecured wide-area network (WAN), such as the Internet, a wireless network, a local-area network, or another type of network. Protected network 115 may comprise a secured computer network such as a local-area network (LAN) in an office or a data center. As illustrated, the LAN may be a corporate network 120 including a plurality of work stations 125. The plurality of work stations 125 are operatively coupled to database 130, FTP (file transfer protocol) server 135, and intranet server 150.

In system 101, the router 100 is connected to the public network 105 and protected network 115 such that network traffic flowing from public network 105 to protected network 115 flows first to the router 100. The router 100 may be a stand-alone network appliance, a component of another network appliance (e.g., firewall appliance), a processor that executes software instructions on a network appliance, or another configuration. The router 100 may be connected to a rules datacenter 140. In general, router 100 inspects network traffic from public network 105 and determines what actions to perform on the network traffic. For example, router 100 classifies packets to implement a number of advanced internet services such as routing, rate limiting, access control in firewalls, virtual bandwidth allocation, policy-based routing, service differentiation, load balancing, traffic shaping, and traffic billing. These services require the router 100 to classify incoming packets into different flows and then to perform appropriate actions depending on this classification.

Figure 2:
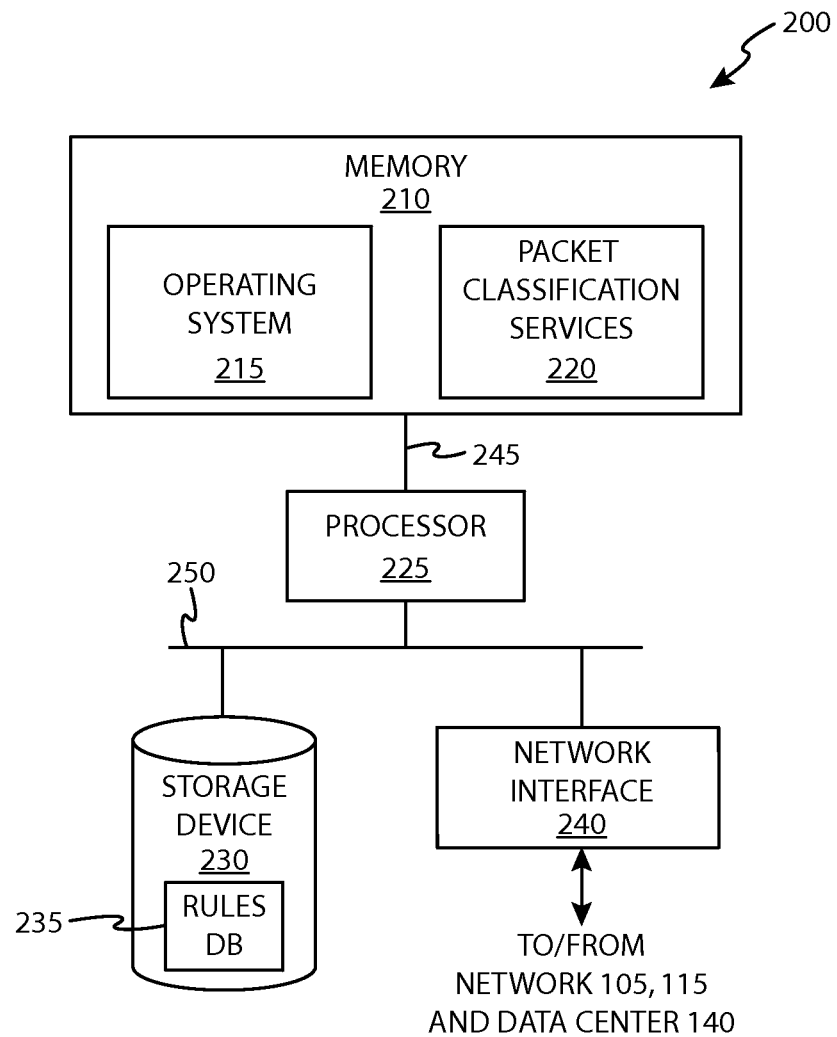
FIG. 2 is a block diagram of a router that may classify packets according to techniques disclosed herein.

FIG. 2 is a high-level block diagram of an exemplary router 200 that may be used with embodiments described herein. Router 200 comprises a memory 210 coupled to a processor 225 via a memory bus 245 and, a storage device 230 and a network interface 240 coupled to the processor 225 via an input/output (I/O) bus 250. It should be noted that the router 200 may include other devices, such as keyboards, display units and the like. The network interface 240 interfaces the router 200 with the secured network 115, public network 105, and rules datacenter 140 and enables data (e.g., packets) to be transferred between the router and other nodes in the system 101. To that end, network interface 240 comprises conventional circuitry that incorporates signal, electrical and mechanical characteristics, and interchange circuits, needed to interface with the physical media of system 101 and protocols running over that media.

The memory 210 is a non-transitory computer-readable medium implemented as a RAM comprising RAM devices, such as DRAM devices and/or flash memory devices. Memory 210 contains various software and data structures used by the processor 225 including software and data structures that implement aspects of the embodiments described herein. Specifically, memory 210 includes an operating system 215 and packet classification services 220. The operating system 215 functionally organizes the router 200 by invoking operations in support of software processes and services executing on router 200, such as packet classification services 220. Packet classification services 220, as will be described below, comprises computer-executable instructions to compile a decision tree data structure from a given set of rules and walk incoming data packets through the compiled decision tree data structure.

Storage device 230 is a conventional storage device (e.g., disk) that comprises rules database (DB) 235 which is a data structure that is configured to hold various information used to compile a decision tree data structure from a given set of rules. Information may include rules having a plurality of fields corresponding to headers of incoming data packets.

In an example embodiment, the router 200 can perform packet classification using a packet classifier, also called a policy database, flow classifier, or simply a classifier. The packet classifier can be included as part of the router's packet classification services 220. A classifier is a collection of rules or policies. Packets received are matched with rules, which determine actions to take with a matched packet. Generic packet classification requires a router to classify a packet on the basis of multiple fields in a header of the packet. Each rule of the classifier specifies a class that a packet may belong to, according to criteria on 'F' fields of the packet header, and associates an identifier (e.g., class ID) with each class. For example, each rule in a flow classifier is a flow specification, in which each flow is in a separate class. The identifier uniquely specifies an action associated with each rule. Each rule has 'F' fields. An ith field of a rule R, referred to as R[i], is a regular expression on the ith field of the packet header. A packet P matches a particular rule R if for every i, the ith field of the header of P satisfies the regular expression R[i].

Classes specified by the rules may overlap. For instance, one packet may match several rules. In this case, when several rules overlap, an order in which the rules appear in the classifier may determine the rule's relative priority. In other words, a packet that matched multiple rules belongs to the class identified by the identifier (class ID) of the rule among them that appears first in the classifier. Alternatively, a unique priority associated with a rule may determine its priority, for example, the rule with the highest priority.

Packet classifiers may analyze and categorize rules in a classifier table and create a decision tree that is used to match received packets with rules from the classifier table. A decision tree is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities. Embodiments described herein utilize decision trees to selectively match a received packet with a rule in a classifier table to determine how to process the received packet.

A decision tree of rules, or tree, represents a set of rules. The decision tree may also be called a Rule Compiled Data Structure (RCDS) or a performance tree. The tree is a binary data structure having nodes and leaves. Each leaf of the tree points to a subset of the rules, called a bucket of rules, or bucket. Each of the buckets represents a subset of the rules. Each bucket is a data structure (e.g., an array) containing pointers to rules, which are stored in a rule table. Rules (or pointers to rules) within a bucket are ordered by priority (e.g., in increasing or decreasing priority). A rule table is a data structure (e.g., an array) containing the rules. Rules within the rule table may be ordered or unordered.

Figure 3:
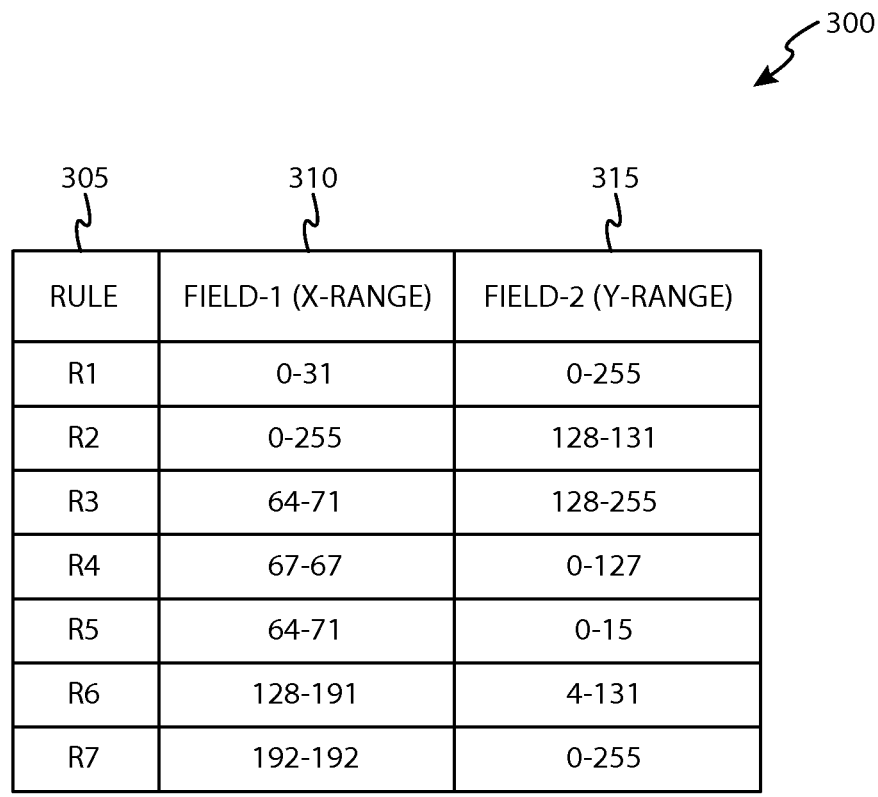
FIG. 3 illustrates a classifier table including rules for classifying a packet, in accordance with an example embodiment of the present disclosure.

FIG. 3 illustrates a classifier table 300 including rules for classifying a packet. As illustrated, the classifier table contains seven rules (R1-R7), each containing two fields, Field-1 (310), and Field-2 (315). Although the table illustrates rules being 2-tuple (e.g., containing only two fields), it should be noted that rules may contain an n number of fields and be n-tuple. Each rule specifies a range of values (e.g., Internet Protocol (IP) addresses or Layer 4 ports or protocols) in each dimension (field). For example, Field-1 (310) may be represented in the x-dimension of an x/y graph, while Field-2 (315) may be represented in the y-dimension of an x/y graph.

Figure 4:
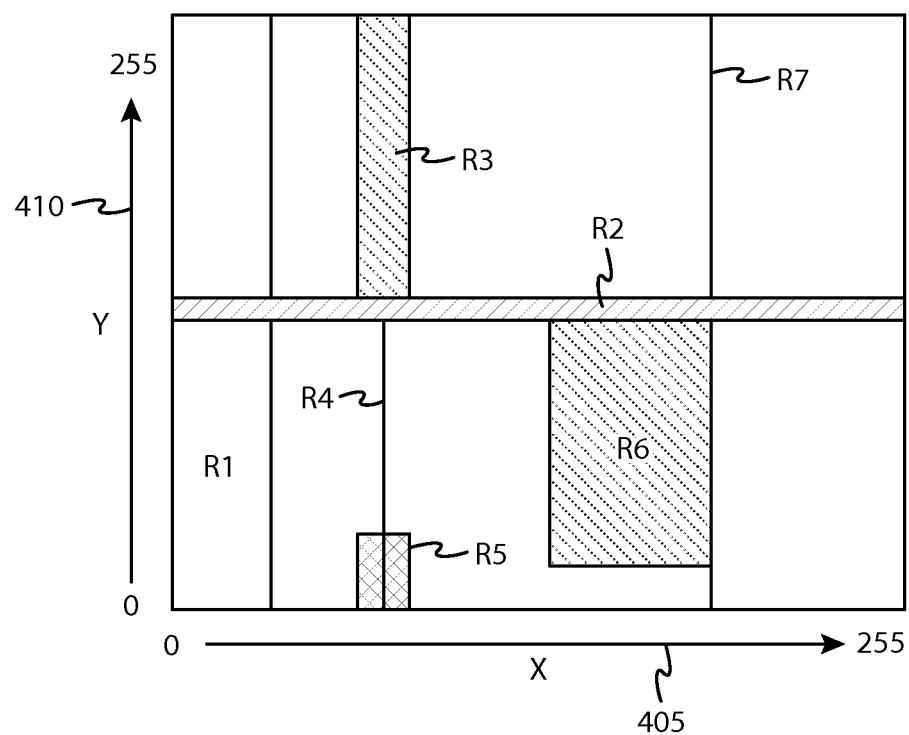
FIG. 4 illustrates a geometric representation of the rules of the classifier table illustrated in FIG. 3, in accordance with an example embodiment of the present disclosure.

FIG. 4 illustrates a geometric representation of the rules of the classifier table 300. The rules range from values 0-255 in both the x-dimension 405 and y-dimension 410. As illustrated, each dimension of the graph is subdivided based on the ranges of each field of each rule from classifier table 300.

Figure 5:
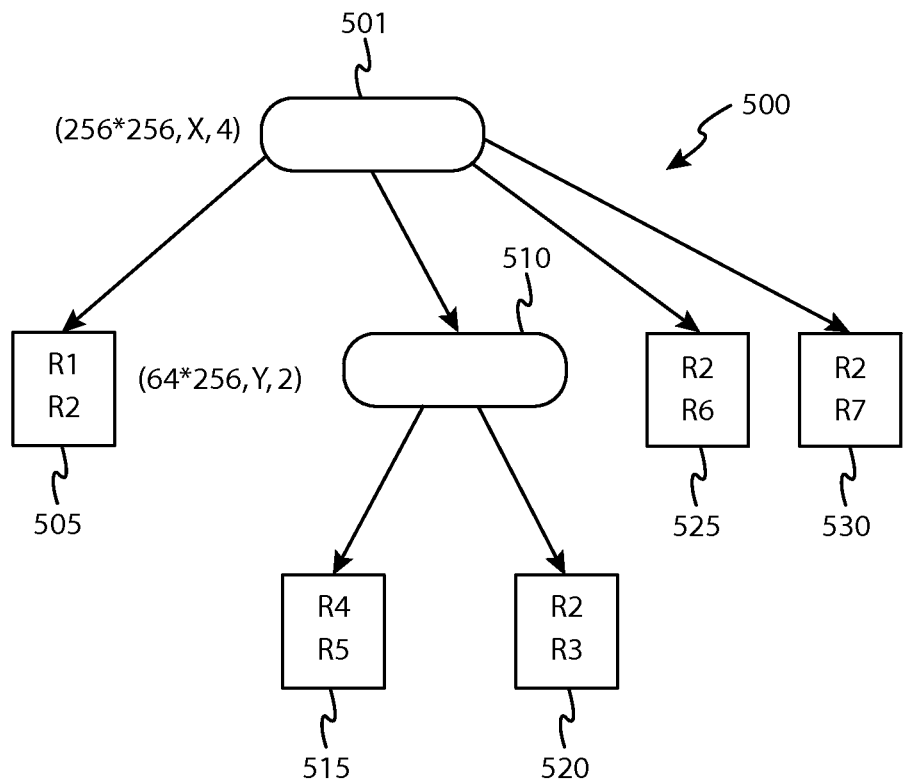
FIG. 5 illustrates a decision tree data structure compiled from the classifier table illustrated in FIG. 3, in accordance with an example embodiment of the present disclosure.

FIG. 5 illustrates a decision tree data structure 500 compiled from the classifier table 300. The decision tree 500 contains a set of elements called nodes (501, 505, 510, 515, 520, 525, 530) that are empty or satisfy one of the following conditions: i) there is a distinguished node r, called the root node, and ii) the remaining nodes are divided into disjoint subsets, each of which is a sub-tree. As illustrated, node 501 is the root node of the decision tree and a parent node of nodes 505, 510, 525, and 530, which are considered child nodes of root node 501. The degree of a node is the number of non-empty sub-trees the node contains. A node with degree zero is considered a leaf node. Thus, nodes 505, 515, 520, 525, and 530 are considered leaf nodes. Nodes with a positive degree are internal nodes (e.g., node 510).

Each node of the decision tree 500 contains a subset of rules of a classifier table. As stated above, each rule has 'F' fields and an ith field of a rule R, referred to as R[i], is a regular expression on the ith field of a received packet header. A packet P matches a particular rule R if for every i, the ith field of the header of P satisfies the regular expression R[i]. Thus, when a packet is received, a decision tree is walked (e.g., by a runtime walker) to determine a matching rule, which is used to determine an action to take with the received packet.

For example, if a packet is received that contains headers matching rule R7 (see FIG. 3), decision tree 500 is walked (e.g., traversed) to find matching rule R7. Thus, the packet is first passed through root node 501, which contains all rules of the packet classification table, which has been cut into four children. Cutting a node refers to subdividing the node into n number of child nodes. The n number of child nodes created corresponds to the number of cuts (subdivisions) of the node that are made. In this example, the rules in root node 501 have been subdivided into four distinct ranges (corresponding to each child node 505, 510, 525, and 530). Thus, it is determined that the packet should be passed to child node 530 that contains a subset of rules having fields within a range of each header of the received packet. After the packet is passed to node 530, the packet is matched with rule R7.

Example embodiments described herein build a decision tree data structure by carefully preprocessing a classifier. Each time a packet arrives, the run time walker traverses the decision tree to find a leaf node that stores a small number of rules. Once the leaf node is reached, a linear search of the rules within the leaf node occurs to find a matching rule.

As stated herein, a router (e.g., router 100 of FIG. 1) inspects network traffic from, for example, a network and determines what actions to perform on the network traffic. For example, the router classifies packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

Figure 6:
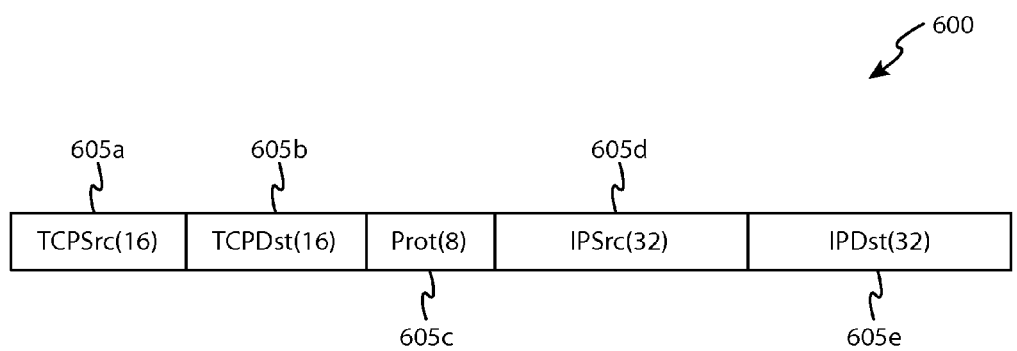
FIG. 6 illustrates an example key generated from a packet received by a router, in accordance with an example embodiment of the present disclosure.

In order to process and classify packets, the router matches the packets with rules, which determine actions to take with a matched packet. For instance, packet classification requires the router to classify a packet on the basis of multiple fields in a header of the packet. In an embodiment, the router receives the packet and creates a key based on the multiple fields in the header of the packet. FIG. 6 illustrates an example key 600 generated from a packet (not shown) received by the router. In particular, the router extracts information from the multiple fields in the header of the packet to form the key 600. The key 600 is 104 bits in size. The key 600 includes five fields 605*a-d* corresponding to the multiple fields in the header of the packet. In this example embodiment, the key includes: i) field 605*a* associated with a TCP source address having a size of 16 bits, ii) field 605*b* associated with a TCP destination address having a size of 16 bits, iii) field 605*c* associated with a Protocol identifier having a size of 8 bits, iv) field 605*d* associated with an IP source address having a size of 32 bits, and v) field 605*e* associated with an IP destination address having a size of 32 bits.

The router passes the key 600 to a search processor of the router to match the packet with a flow processing rule. For instance, each rule has 'F' fields. An ith field of a rule R, referred to as R[i], is a regular expression on the ith field of the packet header. A packet P matches a particular rule R if for every i, the ith field of the header of P satisfies the regular expression R[i]. Thus, the search processor returns a rule R that matches the packet header information contained in the key 600.

Figure 7:
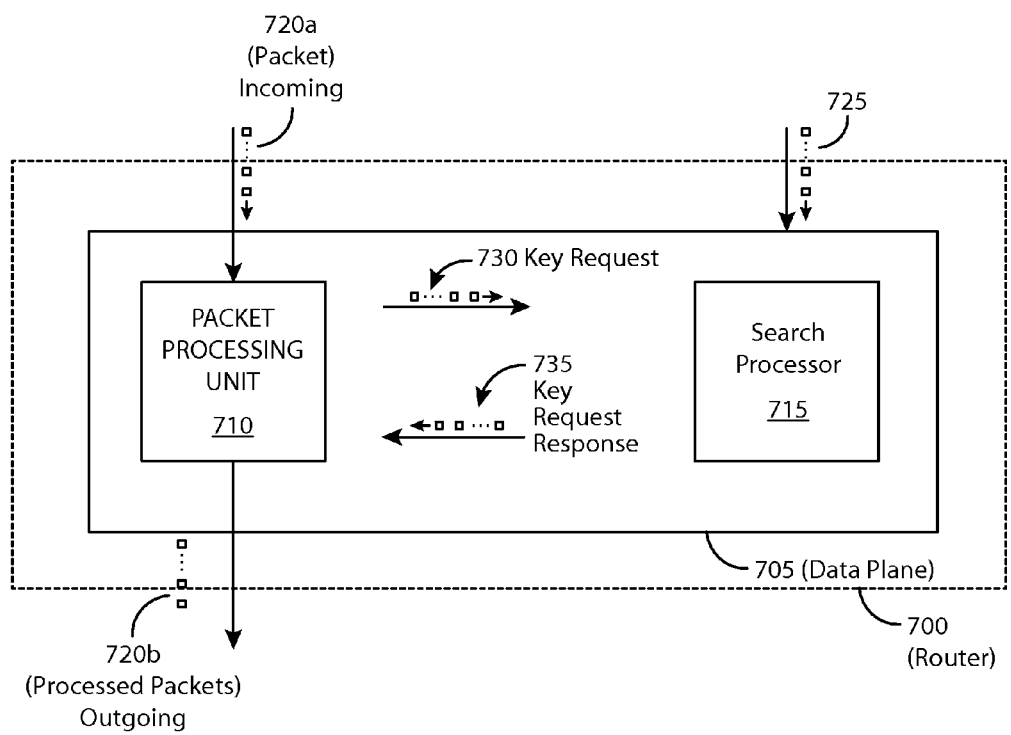
FIG. 7 is a functional block diagram of a data plane of a router used to process incoming packets, in accordance with an example embodiment of the present disclosure.

FIG. 7 is a functional block diagram of a data plane 705 of a router 700 used to process incoming packets 720, in accordance with an example embodiment of the present disclosure. As stated above, the router 700 classifies the packets 720 to implement a number of advanced internet services such as routing, rate limiting, access control in firewalls, virtual bandwidth allocation, policy-based routing, service differentiation, load balancing, traffic shaping, and traffic billing.

In particular, the router 700 receives the incoming packets 720 from a network (e.g., public network 105 of FIG. 1), via a packet processing unit 710 in a data plane 705 of the router 700. The packet processing unit 710 processes each of the packets 720. In order to process each of the packets 720, the packet processing unit 710 creates at least one processing key (e.g., key 600 of FIG. 6) for each of the packets 720. In particular, the packet processing unit 710 extracts information held in at least one field of at least one header of each the incoming packets 720. The extracted information is then used to create the at least one processing key for each of the packets 720.

The packet processing unit 710 passes the at least one key, via a request 730, for information used to process the incoming packets 720 (e.g., a rule R). For example, the processing unit 710 requires information on how to classify the packet to implement at least one of the aforementioned internet services.

The search processor 715 receives the key request 730, including the at least one key, from the packet processing unit 710. In response to receiving the key request 730, the search processor matches the at least one key with a rule R of a set of processing rules 725 received from a rules compiler (not shown). In particular, the search processor 715 selects a search tree or set of search trees, received from the compiler, to traverse the set of processing rules 725. The packet search processor 715 can select a search tree based on information contained in the key request 730 (e.g., fields in the key of the key request 730, size of the key, and number of keys). Once the search tree is selected, the search processor 715 walks the key through the search tree. The search processor 715 reaches a leaf node of the search tree and performs a linear search of all the rules in the leaf node. The search processor then identifies a rule that matches the key. In particular, the matching rule is a rule that includes fields and corresponding field values matching information in the key. The search processor 715 provides the packet processing unit 710 a key request response 735 that includes information associated with the rule. The packet processing unit 710 receives the key request response 735 and processes the incoming packets 720 according to processing information contained in the rule.

In some situations, a key generated for at least one of the incoming packets 720 can be too large for either the packet processing unit 710 or the search processor 715 to process. In order to process such a key, the packet processing unit 710 is configured to modify the key such that the router 700 can process the packet associated with the key. For example, the packet processing unit 710 splits the generated key into a plurality of smaller partial keys as discussed in greater detail below. Each of the plurality of smaller partial keys is passed to the search processor 715. The search processor 715 is configured to return a result for each of the plurality of smaller partial keys as also discussed in greater detail below.

Figure 8:
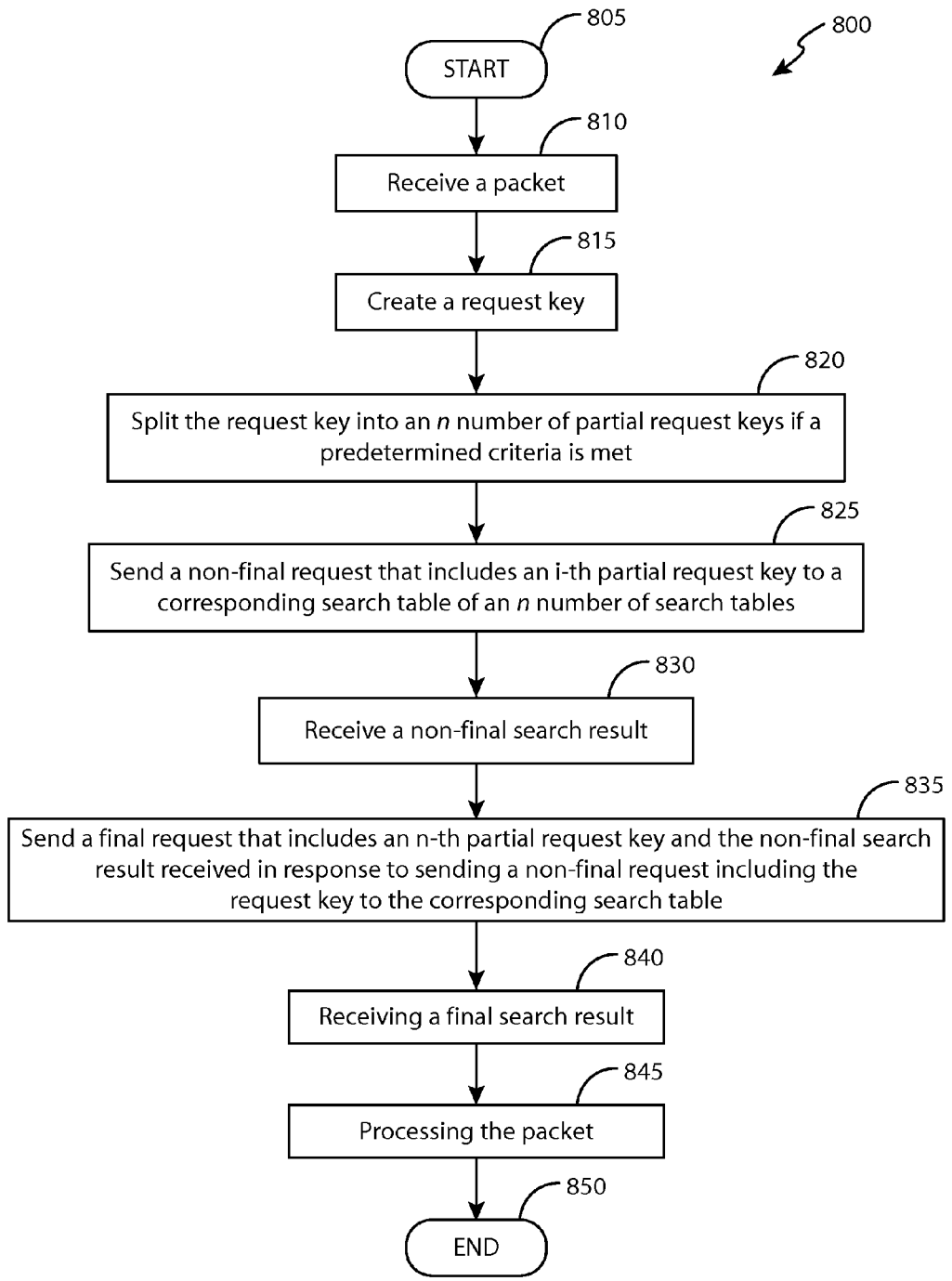
FIG. 8 is a flow diagram of a method for processing packets, in accordance with an example embodiment of the present disclosure.

FIG. 8 is a flow diagram of an example method 800 performed, for example, by a packet processing unit (e.g., the packet processing unit 710) of a router for processing packets. At 805, the method begins. The method 800, at 810, includes receiving a packet. The packet can be received from, for example, a public network (e.g., the public network 105 of FIG. 1). At 815, the method 800 includes creating a request key using information extracted from the packet. In an example, method 800 can include extracting information held in at least one field of at least one header of each the received packet. The extracted information is then used to create the at least one processing key (e.g., the key 900 of FIG. 9) corresponding to the packet.

If a predetermined criterion is met, the method, at 820, includes splitting the request key into an n number of partial request keys, where n>1 and each of the n number of partial request keys is associated with a distinct set of information extracted from the packet. The predetermined criterion can be at least one of: a processing capability of an element of a processing system (e.g., any element of router 700 of FIG. 7) for processing the packet and a size of the request key. The size of the request key can be based on a size and number of data fields from which the information is extracted.

Figure 9:
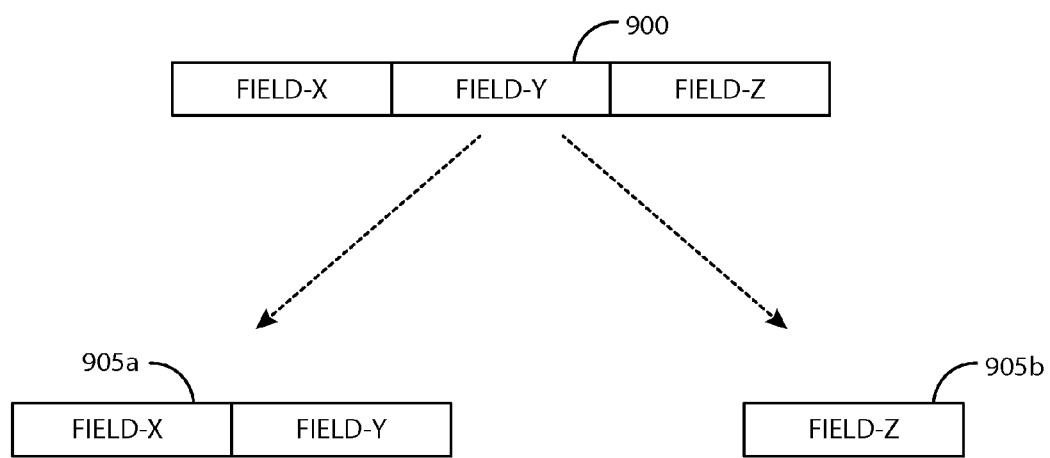
FIG. 9 illustrates a set of partial keys created from an original key generated from a packet received by a router, in accordance with an example embodiment of the present disclosure.

FIG. 9 illustrates a set of partial keys 905a-b created from the key 900. The key 900 is created from a packet (e.g., a packet of the incoming packets 720 of FIG. 7). In this example embodiment, the key includes 3 fields: FIELD-X, FIELD-Y, and FIELD-Z. The size of the key is too large for, for example, a packet processing unit (e.g., the packet processing unit 710 of FIG. 7) to process. In response, the packet processing unit splits the key 900 into smaller keys 905a-b.

Referring back to FIG. 8, the method 800, at 825, further includes sending a non-final request that includes an i-th partial request key to a corresponding search table of an n number of search tables, where i<n. In an example embodiment, if 1<i<n, the non-final request includes the i-th partial request key and the non-final search result received in response to sending any one of or a combination of any previous non-final request. In another embodiment, if 1<i<n, the non-final request may only include the i-th partial request key.

For example, the non-final request can be sent to a search processor (e.g., the search processor 715 of FIG. 7). The search processor includes data structures storing a set of rules used to process the received packet. The data structures can be organized in the form of a search table. However, it should be noted that the data structures can be organized in any other form, for example, a search tree.

In response to sending the non-final request, the method 800, at 830, includes receiving a non-final search result from the corresponding search table. The non-final search result can include a cookie. At 835, the method 800 includes sending a final request that includes an n-th partial request key and the non-final search result received in response to sending the non-final request to the corresponding search table. The method 800, at 840, also includes receiving a final search result from the corresponding search table in response to sending the final search request. The final search result includes information that identifies a rule having instructions used by, for example, the packet processing unit, to process the packet. At 845, the method 800 includes processing the packet based on processing data included in the final search result. At 850, the method 800 ends.

As stated above, a generated key (e.g., key 900 of FIG. 9) includes several fields corresponding to information extracted from multiple fields in at least one header of a received packet. In some embodiments, the generated key may be of a size that is too large for a processing element of a router (e.g., the router 700 of FIG. 7) to process. In such situations, a packet processing unit (e.g., the packet processing unit 710) of the router is configured to process the generated key according the method 800 as described above. In addition, a search processor (e.g., the search processor 715 of FIG. 7) is also configured to process multiple partial request keys. In particular, the search processor is configured to, using each of the n partial request keys, perform a search on a rule set and return a result. In an example embodiment, the search processor 715 is able to perform said searches by using data structures configured to enable the search processor to perform a search on a set of rules using the partial request keys. The data structures (e.g., search trees) are generated by a compiler as described in greater detail below.

Embodiments described herein include at least three data structures that include: i) a tree, ii) buckets, and ii) a rule table. A tree includes nodes and leaf nodes. Leaf nodes may be linked to buckets. The leaf nodes may point to buckets, buckets may contain a set of rules. Embodiments described herein may store rules in common tables and the buckets pointed to by leaf nodes may contain rule numbers corresponding to the rules in the rules table. Buckets may include rules in any suitable manner as may be known to one skilled in the art. Each bucket may be a data structure that may include one or more bucket entries. A bucket entry may be a rule, an index to a rule, a pointer to a rule, a pointer to a set of rules, or a pointer to another bucket. A bucket may include a linked list to the rules. A bucket may include entries including any combination thereof. For example, a bucket may have one entry that is a pointer to a rule and one entry that is a pointer to a set of rules, etc. Rule priority may be stored with a rule or linked to a rule in any suitable manner.

Figure 10A:
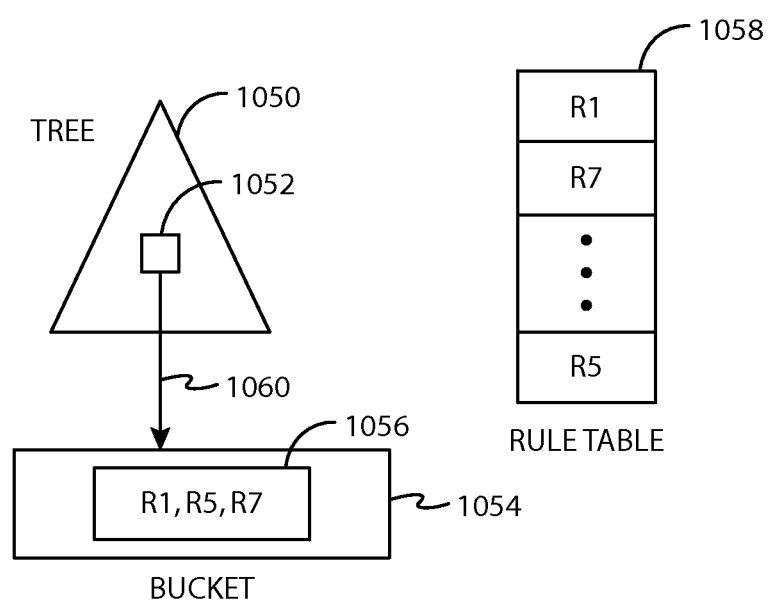
FIG. 10A is an illustration of a tree, a leaf node pointing to a bucket containing a set of rules of a classifier rule table.

FIG. 10A is an illustration of an example embodiment of a tree 1050, a leaf node 1052 pointing to (1060) a bucket 1054 containing a set of rules 1056 of a classifier rule table 1058.

Figure 10B:
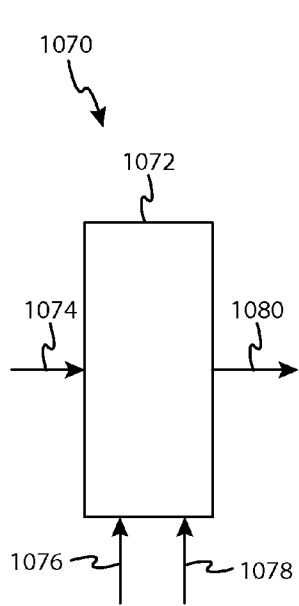
FIG. 10B is a block diagram illustrating an example embodiment of compiling a set of rules into a decision tree data structure.

FIG. 10B is a block diagram 1070 illustrating an example embodiment of compiling a set of rules into a decision tree data structure. A compiler 1072 may receive a rule set 1074, a maximum tree depth 1076 and a number of sub trees 1078 in, for example, a control plane of a router (e.g., router 700 of FIG. 7). The compiler 1072 may generate a set of compiled rules 1080.

Figure 10C:
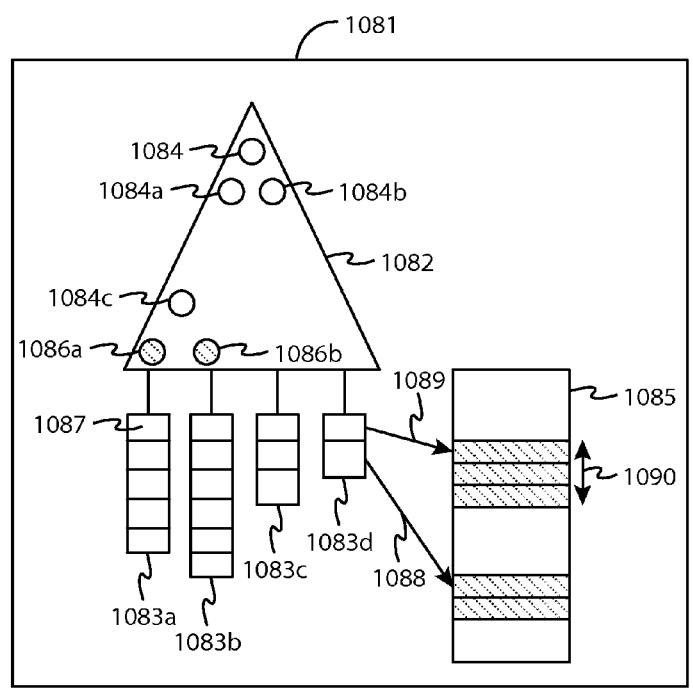
FIG. 10C illustrates a decision tree data structure including a tree, buckets, and rules.

FIG. 10C illustrates a decision tree data structure 1081 including a tree, buckets, and rules. The set of compiled rules 1080 may generate a decision tree data structure 1081 including a tree 1082, buckets 1083a-d, and rules 1085. The tree 1082 may include a root node 1084, nodes 1084a-c, and leaf nodes 1086a-b. Each leaf node 1086 of the tree 1082 points to a bucket 1083. Each bucket may include one or more bucket entries 1087. A leaf node may include bucket information that may be used to locate the bucket entries or a bucket list of entries. A bucket entry may be a pointer to rule (1088), or a pointer (1089) to a set of rules (1090). The set of rules 1090 may be a sequential group of rules, or a group of rules scattered throughout the memory, either organized by a plurality of pointers or by a method used to recollect the set of rules. The set of rules 1090 may also be called a chunk, or a chunk of rules. A bucket entry that points to the set of rules 1090 may be called a chunk pointer.

Figure 11:
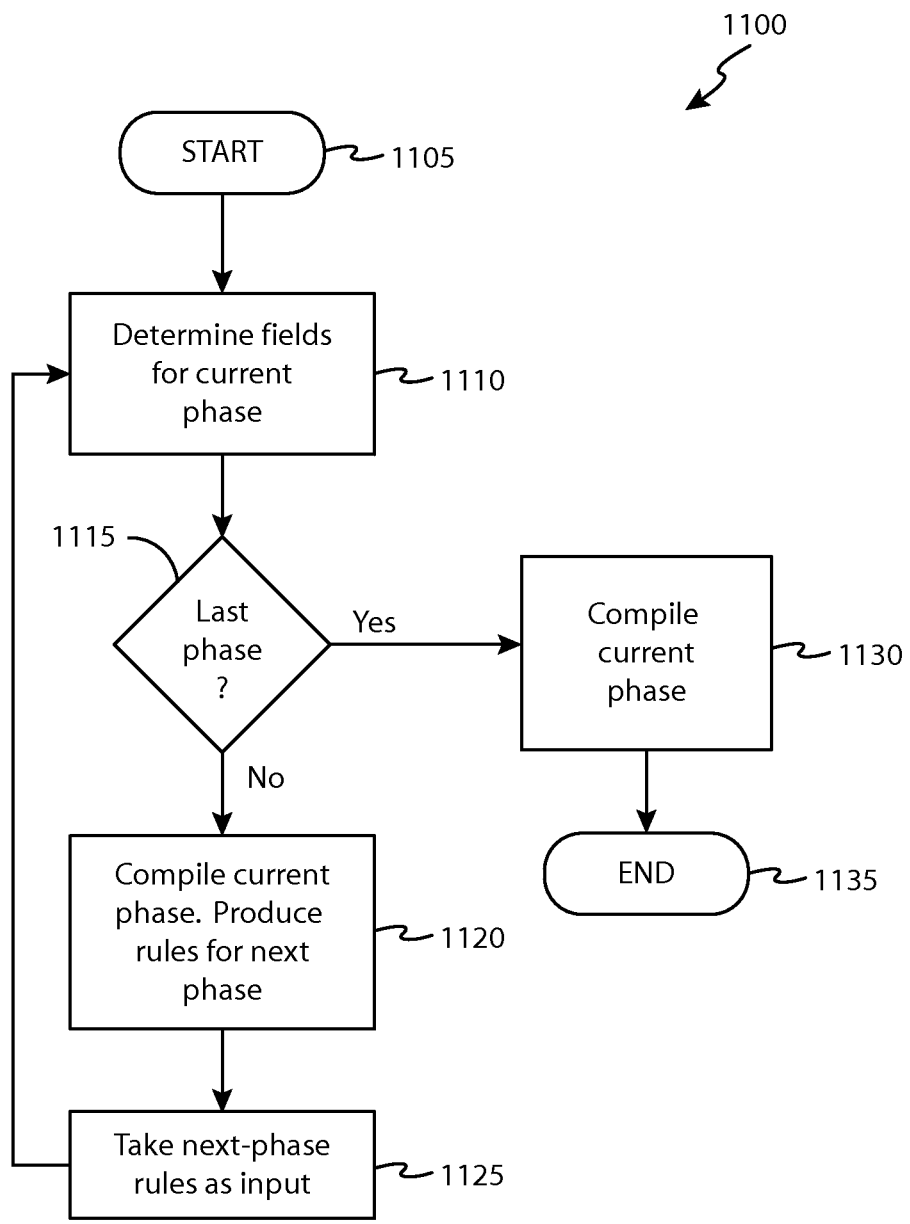
FIG. 11 illustrates a method for compiling search trees for processing partial search keys generated from an original search key, in accordance with an example embodiment of the present disclosure

FIG. 11 illustrates a method 1100 executed, for example, by a compiler (e.g., compiler 1072 of FIG. 10B) for compiling search trees for processing partial search keys in accordance with an example embodiment of the present disclosure. In order to compile the search trees, the compiler receives a rule set from which to compile the search trees. Each rule in the rule set includes a plurality of fields.

Figure 12:
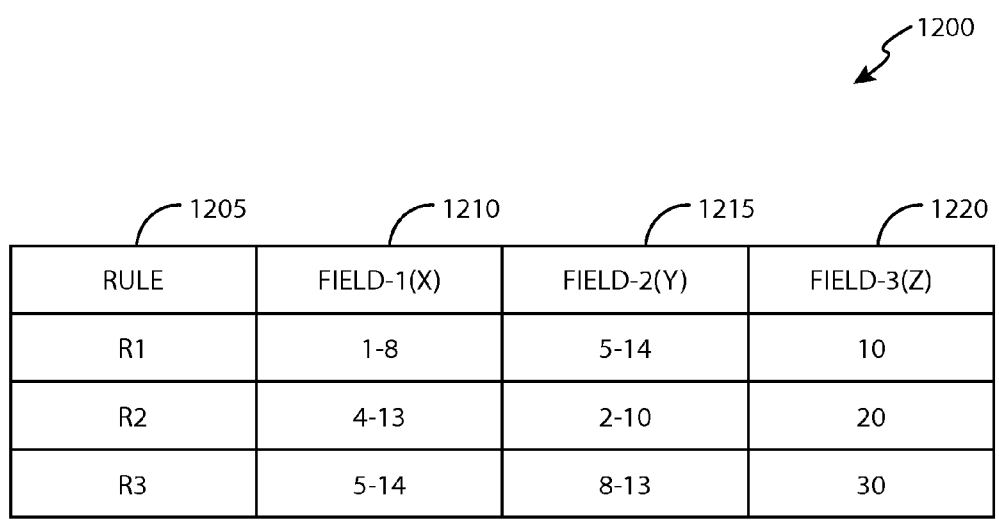
FIG. 12 illustrates a classifier table received by a compiler, in accordance with an example embodiment of the present disclosure.

FIG. 12 illustrates an example rules table 1200 that includes rules to be compiled by the compiler. As illustrated, the rules table 1200 contains three rules (R1-R3), each containing three fields, Field-1 (1210), Field-2 (1215), and Field-3 (1220). Although the table illustrates rules being 3-tuple (e.g., containing only three fields), it should be noted that rules may contain an n number of fields and be n-tuple. Each rule specifies a range of values (e.g., Internet Protocol (IP) addresses or Layer 4 ports or protocols) in each dimension (field). For example, Field-1 (1210) may be represented in the x-dimension of an x/y graph, while Field-2 (1215) may be represented in the y-dimension of an x/y graph. In addition, Field-3 (1220) may be a value represented as planes overlaying the x/y graph in the third z-dimension.

In addition, the compiler receives information corresponding to a maximum processing capability of a router (e.g., router 700) used to process packets. The compiler uses the information in order to determine a number of processing phases required to process a packet received that corresponds to a rules set stored by the router. As stated above, packets received are matched with rules, which determine actions to take with a matched packet. In particular, packet classification requires a router to classify a packet on the basis of multiple fields in a header of the packet. Each rule of the classifier specifies a class that a packet may belong to, according to criteria on 'F' fields of the packet header, and associates an identifier (e.g., class ID) with each class. The identifier uniquely specifies an action associated with each rule. Each rule has 'F' fields. An ith field of a rule R, referred to as R[i], is a regular expression on the ith field of the packet header. A packet P matches a particular rule R if for every i, the ith field of the header of P satisfies the regular expression R[i].

Further, once a packet is received by the router, a key is generated from multiple fields in at least one header of the packet. The size of the key is based on the number of fields from which information is extracted from the headers of the packet. The router may only be able to process a key up to a specific size (e.g., 320 bits). Thus, if a key is generated that is of a size greater than the processing capability of the router, the router splits the key into multiple partial keys as per embodiments of the present disclosure described herein.

Thus, in response to the compiler receiving a rules set (e.g., rules table 1200) and the information corresponding to the processing capability of the router, the compiler is able to determine a number of processing phases required to process a packet. In other words, the compiler creates a separate processing to process a respective partial key of the multiple partial keys.

Referring back to FIG. 11, the method 1100, at 1105, begins by receiving a rules set (e.g., the rules table 1200 of FIG. 12) and information corresponding to a processing capability of a router (e.g., a maximum key size supported by any processor of the router). At 1110, the method 1100 includes determining fields from the rules table from which to compile a search tree or set of search trees for a current processing phase. In particular, the compiler selects fields from the rules table that have not been used to process a previous processing phase. In addition, the compiler selects any subset of the fields such that a partial key corresponding to the subset of the fields does not exceed a size greater than the processing capability of the router. If the current phase is not a first phase, the method 1100 includes selecting a field corresponding to cookie values associated with the rules. The cookie values are generated from compiling a set of search trees for the search phase preceding the current processing phase.

The method 1100, at 1115, includes determining whether the current processing phase is the last phase. For instance, the method determines if all the fields from the rules table have been selected. If all the fields have not been selected, the current phase is not the last phase and the method 1100 proceeds to step 1120. If all the fields have been selected, the current phase is the last phase and the method 1100 proceeds to step 1130. At 1130, the compiler compiles a search tree corresponding to the last processing phase according to the method 1300 of FIG. 13. Then, at 1135, the method 1110 ends.

Figure 13:
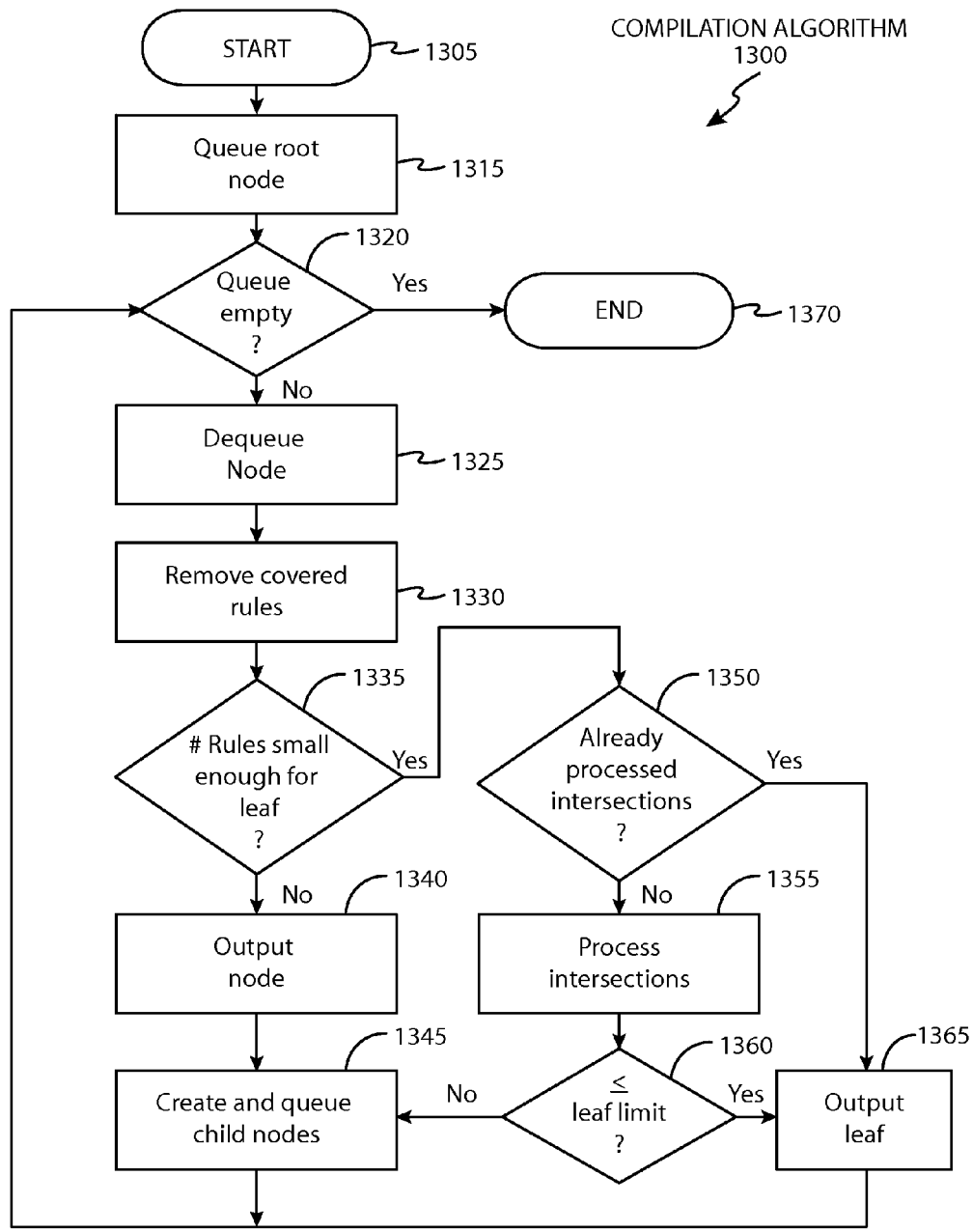
FIG. 13 illustrates a method for compiling a search tree corresponding to the current phase, in accordance with an example embodiment of the present disclosure.

At 1120, the method 1100 includes compiling a search tree or set of search trees corresponding to the current phase and producing a rules set for subsequent processing phases as described in the method 1300 of FIG. 13. The method 1100, at 1125, includes providing the rules set for the next processing phase as input to the compiler for compiling a next processing phase(s). The method 1100 then continues at step 1110.

FIG. 13 illustrates a method 1300 for compiling a search tree or set of search trees corresponding to the current phase. The method can be executed by a compiler (e.g., the compiler 1072 of FIG. 10B). It should be noted that the method 1300 for compiling the search tree can utilize any known compiling method (e.g., a breadth first and a depth first). At 1305, the method 1300 begins. The method 1300, at 1315, queues a root node in a node processing queue. The node processing queue includes a list of nodes to be compiled for the search tree. At 1320, the method 1300 determines if the node processing queue is empty. If the queue is empty, the method 1300 ends at 1370. If the method 1300 determines that the node processing queue is not empty, processing continues at 1325. At 1325, the method includes selecting a node from the queue and removing the node from the queue for processing.

The method 1300, at 1330, includes removing covered rules from the node. In particular, the method 1300 removes lower priority rules that are covered by a higher priority rule. A lower priority rule is covered by a higher priority rule if the higher priority rule completely overlaps the lower priority rule in each tuple (e.g., dimension or field) of the lower priority rule. For example, referring to FIG. 4, if a rule R8 is introduced having an X-RANGE of 130-185 and a Y-RANGE of 20-50, then rule R8 would be overlapped by rule R6. Further, if rule R6 has a higher priority than rule R8, rule R8 is removed from the current node. In an example embodiment, a rule is removed if it is covered by a higher priority rule in all fields of the rule. In another embodiment, a rule is removed if it is covered by a higher priority rule in all fields that have yet to be processed by the method 1100 of FIG. 11 including the fields associated with the current phase.

At 1335, the method 1300 determines if a number of rules in the current node is less than a predetermined threshold. The predetermined threshold can be, for example, any number selected by a user or dynamically selected by a processor. In an example, the threshold can be selected based on an optimal speed associated with traversing the search tree. The optimal speed can be determined, for example, through experimentation or statistical modeling.

If the number of rules in the current node is not less than the predetermined threshold, the method 1300 continues at 1340. At 1340, the method 1300 includes outputting the node in a data structure identifying the node in the search tree. At 1345, the method 1300 continues to process the current node as a non-leaf node and creates and queues child nodes in the processing queue for further processing. The method 1300 then continues at 1320.

If the number of rules in the current node is less than the predetermined threshold, the method 1300 continues at 1350 and processes the current node as a leaf node. The method 1300, at 1350, determines if intersections of rules have already been processed for rules in the current node by a previous parent node. A parent node can be any node in a family of nodes preceding the current node (e.g., a grandparent node). If the method 1300 determines that the intersections have already been processed, the method continues at 1365. At 1365, the method 1300 includes outputting the node as a leaf node in a data structure identifying the node as a leaf node of the search tree. The method 1300 then continues at 1320.

If the method 1300 determines that the intersections have not been processed, the method 1300, at 1355, processes the intersections. The intersections are processed, for example, according to either of the methods described FIG. 14A or FIG. 15. At 1360, the method 1300 determines if a number of rules in the current node is still less than the predetermined threshold due to any new rules created from step 1355. If the method 1300 determines the number of rules is still less than the predetermined threshold the method continues at 1365. If not, the method continues at 1345 and processes the current node as a non-leaf node.

Figure 14A:
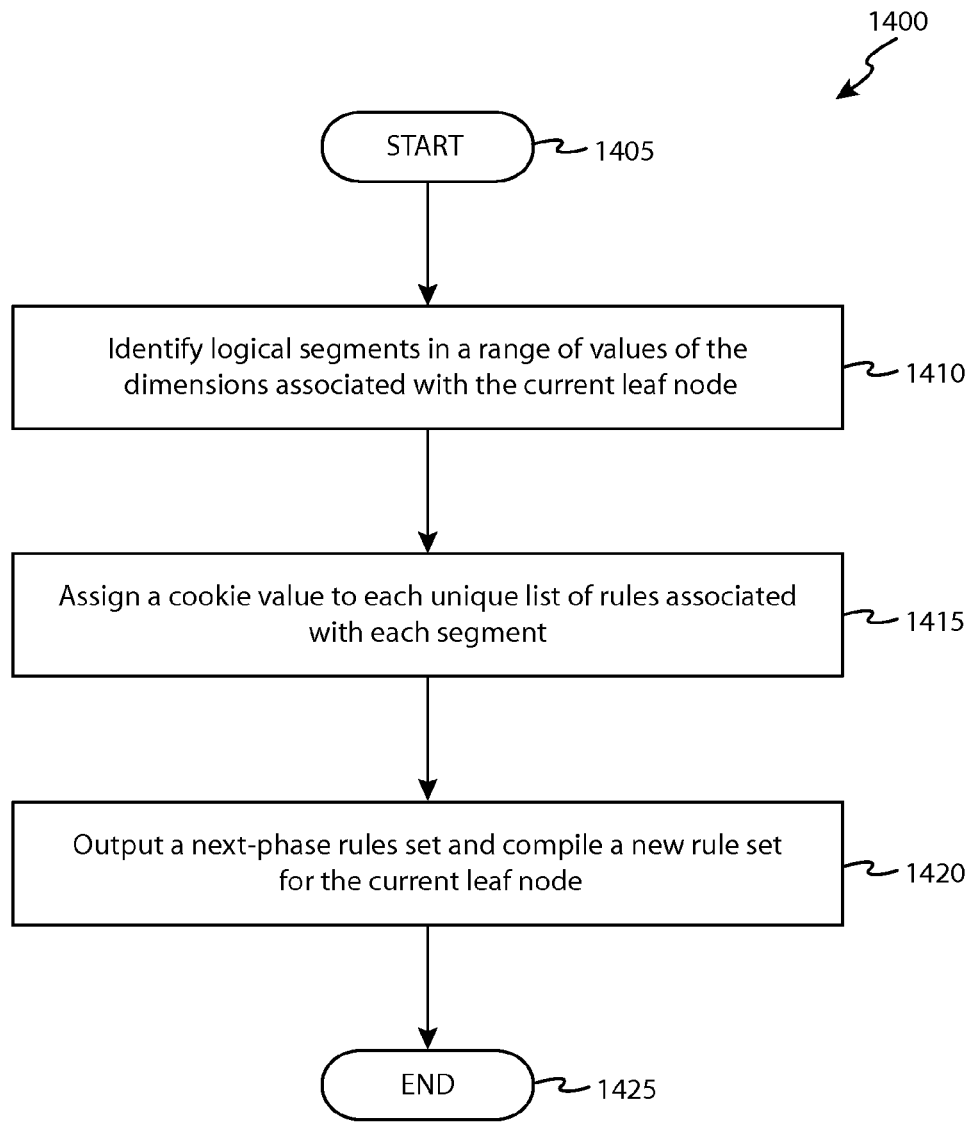
FIG. 14A illustrates a method for processing intersections of rules in a leaf node of a search tree, in accordance with an example embodiment of the present disclosure.
Figure 14B:
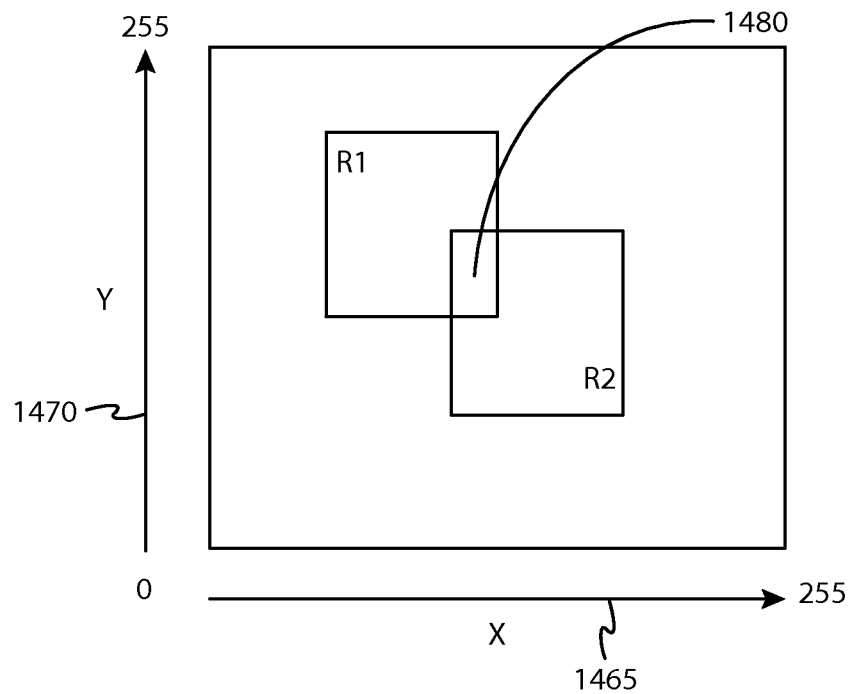
FIG. 14B illustrates a geometric representation of the rules in a leaf node of a search tree, in accordance with an example embodiment of the present disclosure.
Figure 14C:
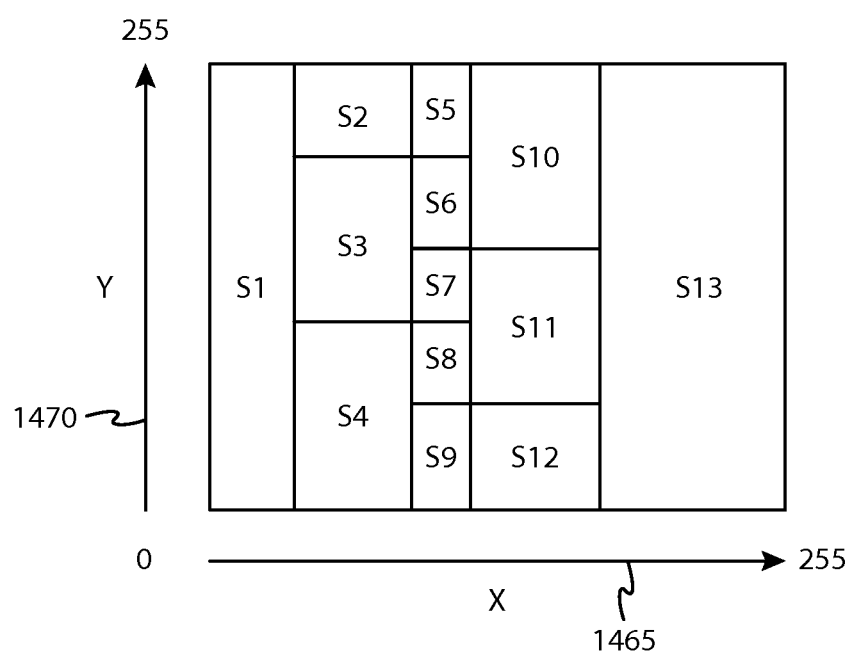
FIG. 14C illustrates a segmentation of the geometric representations of the rules in the current leaf node, in accordance with an example embodiment of the present disclosure.

FIG. 14A illustrates a method 1400 for processing intersections of rules in a leaf node of a search tree, in accordance with an example embodiment of the present disclosure. At 1405, the method 1400 begins. In order to further elaborate the concept of FIG. 14A, FIG. 14B, using an example rules set, illustrates a geometric representation of the example rules set in the current leaf node. The rules range from values 0-255 in both the x-dimension 1465 and y-dimension 1470. As illustrated rule R1 and rule R2 include an intersecting region 1480. Thus, traversing the tree associated with the processing phase associated with the x-dimension and the y-dimension of an n-tuple rule set can yield a match in the intersecting region 1480. However, at this phase of processing, it cannot be known which rule is a match. Thus, embodiments of the present disclosure: i) identify logical segments in a range of values of the dimensions associated with the current leaf node; ii) assign cookie values to each of the logical segments; and iii) define a new rule for each of the logical segments. For example, referring back to FIG. 14A, the method 1400, at 1410 identifies the segments. FIG. 14C illustrates a segmentation of the geometric representations of the rules in the current leaf node. Each segment is a region of the rules in the current leaf node that intersects a same subset of the rules in the current leaf node. For example, segment S7 represents the intersecting region 1480 where rule R1 and rule R2 intersect. In particular, intersecting region 1480 is the intersection of the values of the fields used in the current phase being processed in the method 1100 of FIG. 11 (e.g., block 1110). In addition, segments s3 and s6 collectively represent rule R1. Also, segments s8 and s11 represent rule R2. The rest of the illustrated segments, namely segments: S1, S2, S5, S10, S12, S13, S9, and S4, represent regions of the current leaf node where no rules exist. Hence, they are ignored for any further processing. Referring back to FIG. 14A, the method 1400, at 1415, assigns cookie values to each unique list of rules associated with each segment. For instance, a list of rules including rule R1 and rule R2 is assigned a cookie value with respect to segment s7 (e.g., cookie C1). Also, a new rule (e.g., rule R3) is created to describe segment s7. In addition, a list of rules including only rule R1 is assigned a different cookie value for segments s3 and s6 (e.g., cookie C2). Similarly, another list of rules including only rule R2 is assigned a different cookie value for segments s8 and s11 (e.g., cookie C3). At 1420, the method 1400 outputs a rule set for subsequent processing phases according to FIG. 16A. In addition, at 1420, the method 1400 creates a new rule for each of the segments and replaces the rules in the current leaf node with each new rule that is created. It should be noted that every field of the new rule created describe the complete region of its corresponding segment.

Figure 15:
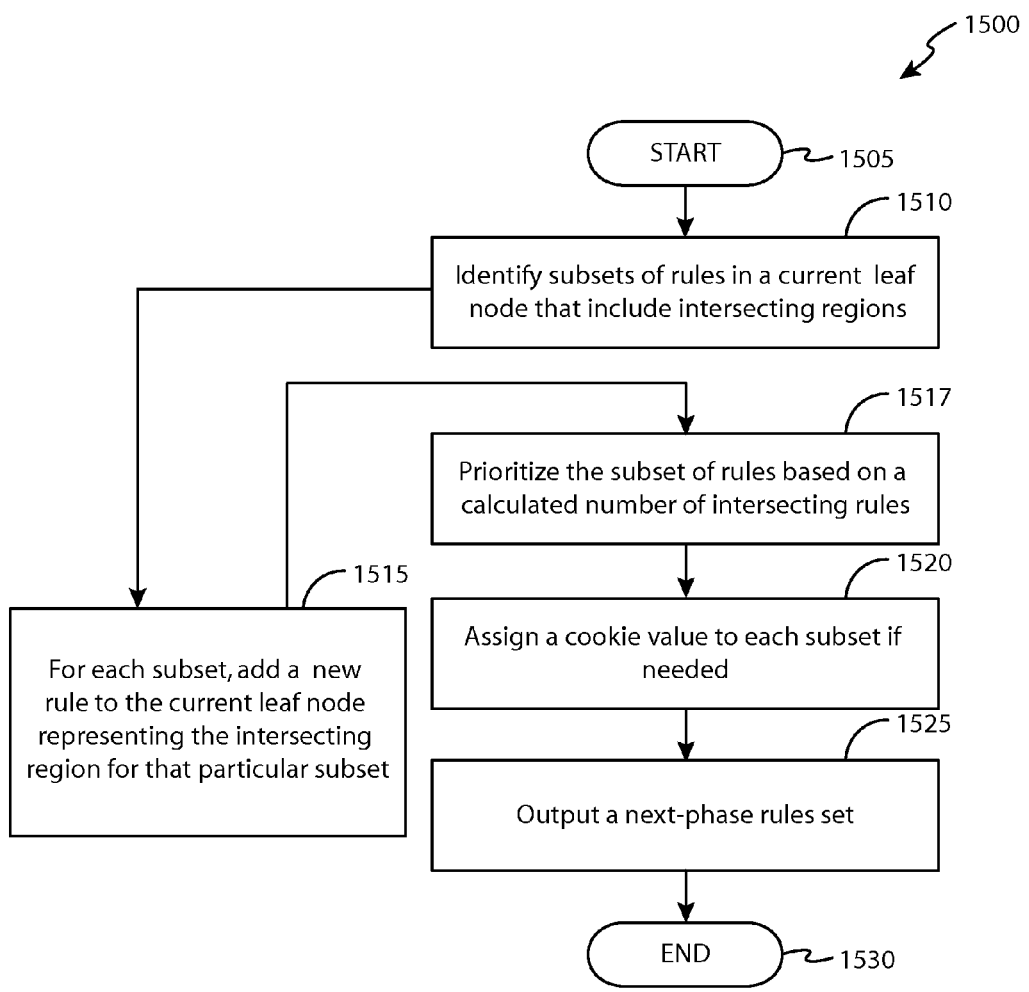
FIG. 15 illustrates another method for processing intersections of rules in a leaf node of a search tree, in accordance with an example embodiment of the present disclosure.

FIG. 15 illustrates another method 1500 for processing intersections of rules in a leaf node of a search tree, in accordance with an example embodiment of the present disclosure. The method 1500 begins at 1505. At 1510, the method 1500 identifies each possible subset of the rules in the current leaf node that includes intersecting regions. In an example, the method 1500 can enumerate each possible subset of two or more rules in the leaf node. The method 1500 then processes each subset to determine if the subset includes an intersection. In an example embodiment, the method 1500 identifies an intersection for a given subset if all the rules in the subset intersect with each other. For each of the identified intersection, the method 1500, at 1515, creates and adds a rule to the leaf node for each identified intersection. It should be noted that all the fields of the new rule created describe the complete region of its corresponding intersection.

At 1517, the method 1500 includes prioritizing the added rules based on a number of intersecting rules associated with each added rule. A priority of the newly added rules is higher than the original rules in the current leaf node and a relative priority amongst the original rules remains the same. The method, at 1520, assigns a unique cookie value to each rule including the original rules in the current leaf node and newly added rules. At 1525, the method includes outputting a rules set for subsequent processing phases according to method 1601 of FIG. 16B. At 1530, the method ends.

Figure 16A:
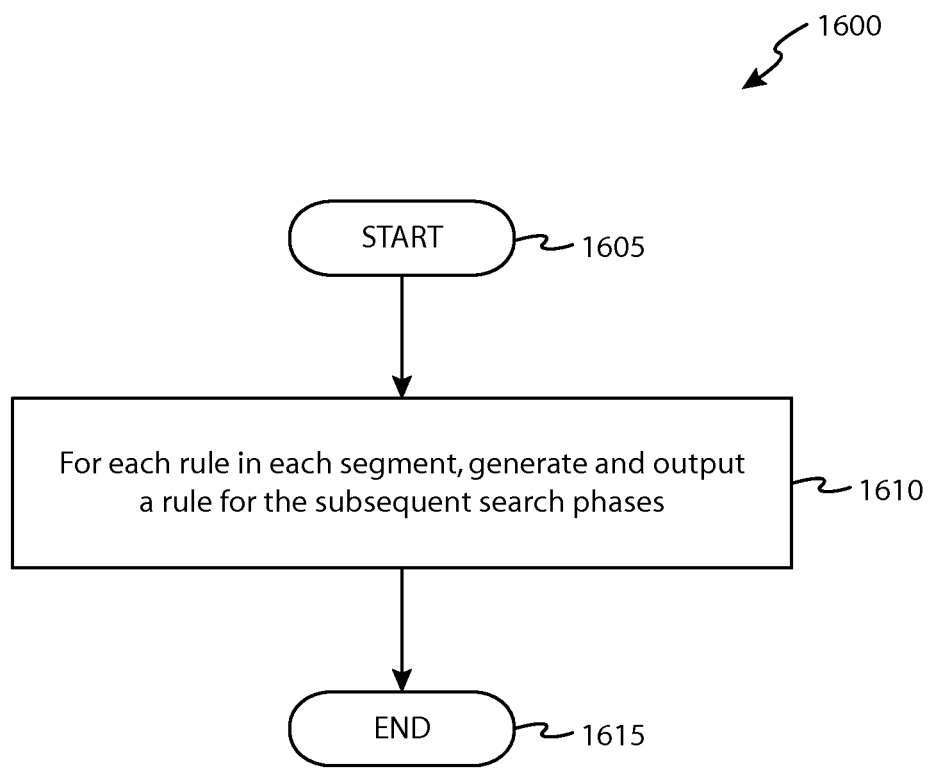
FIG. 16A illustrates an example method for outputting next-phase rules to be processed by a compiler for compiling a next-phase search tree.

FIG. 16A illustrates a method 1600 for outputting a rules set for subsequent phases to be processed by a compiler for compiling a next-phase set of search trees. At 1605, the method 1600 begins. At 1610, the method 1600 includes outputting a rules set for subsequent phases from the current leaf node. In particular, the method 1600 includes, for each rule in a subject segment of the identified at least one segment, generating and outputting a rule for subsequent search phases. The rule includes: i) each rule field of the rule fields corresponding to the subsequent search phases, and ii) a new field for the unique cookie value associated with the subject segment. For each of the generated rules from the subject segment, method 1600 includes assigning a relative priority equivalent to a relative priority of the corresponding rule of the subject segment.

In particular, assuming a 3-tuple rule set as illustrated in FIG. 12, if a current phase processed FIELD-1 and FIELD-2, the method 1600 outputs next phase rules including FIELD-3 and a new field associated with the cookie values assigned to the rules. At 1615, the method 1600 ends. For example, Table 1 illustrated below provides a set of rules for subsequent phases that are outputted by method 1600 from a leaf node geometrically represented by FIG. 14C.

TABLE 1

Subsequent Phases Rules

| Comments | Rule number | Cookie Value | Field |
|---|---|---|---|
| Corresponding to Segment S3 and S6) | 1 | C2 | Rule $1_{FIELD-3}$ |
| Corresponding to Segment S7 | 2 | C1 | Rule $1_{FIELD-3}$ |
| Corresponding to Segment S7 | 3 | C1 | Rule $2_{FIELD-3}$ |
| Corresponding to Segment S8 and S11 | 4 | C3 | Rule $2_{FIELD-3}$ |

Figure 16B:
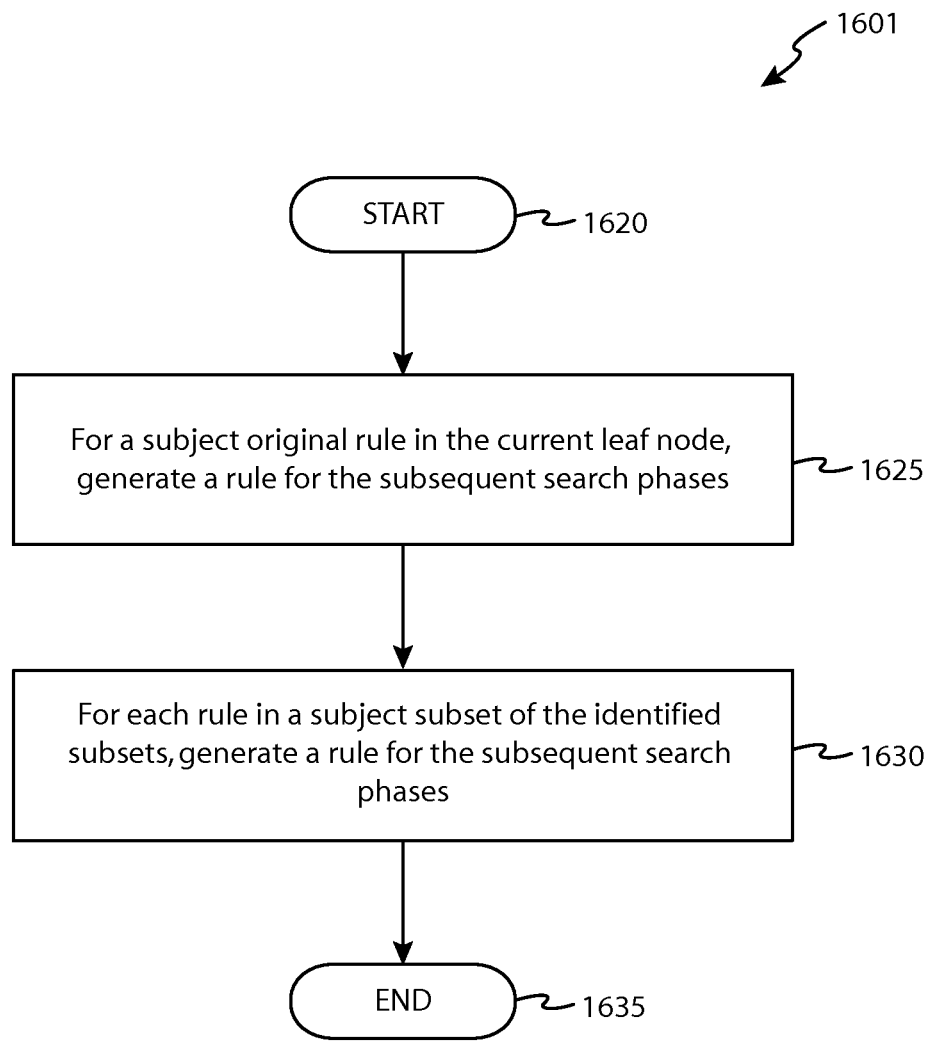
FIG. 16B illustrates another example method for outputting next-phase rules to be processed by a compiler for compiling a next-phase search tree.

FIG. 16B illustrates another method 1601 for outputting a rules set for subsequent phases to be processed by a compiler for compiling a next-phase set of search trees. The method begins at 1620. At 1625, the method 1601 includes, for a subject original rule of each original rule in the current leaf node, generating and outputting a rule for subsequent search phases. The rule includes: i) each rule field corresponding to subsequent search phases, and ii) a new field for the unique cookie value associated with the subject rule. At 1630, the method 1601 includes, for each intersecting rule in a subject subset of the identified subsets, generating and outputting a rule for the subsequent search phases. The rule includes: i) each rule field corresponding to the subsequent search phases, and ii) a new field for the unique cookie value associated with the subject subset. For each of the generated rules for the subject subset, method 1601 assigns a relative priority equivalent to the relative priority of the corresponding intersecting rule of the subject subset. At 1635, the method 1601 ends.

For example, Table 2 illustrated below provides a set of rules for subsequent phases that are outputted by method 1601 from a leaf node geometrically represented by FIG. 14B. As explained above, at 1520, the method 1500 assigns unique cookie value to newly added rules as well as to original rules in the current leaf node. In particular, referring to FIG. 14B, after method 1500 ends, there are three rules in the current leaf node for the current phase, namely: one newly added rule to represent intersecting region 1480 and two original rules (R1 & R2). Assuming, a cookie value C1 is assigned to the newly added rule, cookie value C2 is assigned to original rule R1 and cookie value C3 is assigned to original rule R3.

TABLE 2

Subsequent Phases Rules

| Comments | Rule number | Cookie Value | Field |
|---|---|---|---|
| Corresponding to intersecting region 1480 | 1 | C1 | Rule $1_{FIELD-3}$ |
| Corresponding to intersecting region 1480 | 2 | C1 | Rule $2_{FIELD-3}$ |
| Corresponding to original rule R1 | 3 | C2 | Rule $1_{FIELD-3}$ |
| Corresponding to original rule R2 | 4 | C3 | Rule $2_{FIELD-3}$ |

As used in this disclosure, a subset of a set can include one or more than one, including all, members of the set. Further, as used in this disclosure, a first variable is an increasing function of a second variable if the first variable does not decrease and instead generally increases when the second variable increases. On the other hand, a first variable is a decreasing function of a second variable if the first variable does not increase and instead generally decreases when the second variable increases. In some embodiment, a first variable is an increasing or a decreasing function of a second variable if, respectively, the first variable is directly or inversely proportional to the second variable.

It should be understood that the block, flow, network diagrams may include more or fewer elements, be arranged differently, or be represented differently. It should be understood that implementation may dictate the block, flow, network diagrams and the number of block, flow, network diagrams illustrating the execution of embodiments described herein.

It should be understood that elements of the block, flow, network diagrams described above may be implemented in software, hardware, or firmware. In addition, the elements of the block, flow, network diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and other non-transitory forms of computer readable medium. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

The invention claimed is:

1. A method, executed by one or more processors, for processing a data packet, the method comprising:
   receiving the packet;
   creating a first request key using information extracted from the packet;
   splitting the first request key into an n number of partial request keys if at least one predetermined criterion is met, wherein n>1 and each of the n number of partial request keys is associated with a distinct set of the information extracted from the packet;
   sending a non-final request that includes an i-th partial request key to a corresponding search table of an n number of search tables, wherein i<n;
   receiving a non-final search result from the corresponding search table;
   sending a final request that includes an n-th partial request key and the non-final search result received in response to sending the non-final request to the corresponding search table;
   receiving a final search result from the corresponding search table; and
   processing the packet based on processing data included in the final search result.

2. The method of claim 1, wherein the packet includes at least one header and the information is extracted from at least one data field of the at least one header.

3. The method of claim 2, wherein the distinct set of information is extracted from data stored in a set of data fields corresponding to a subset of the at least one data field of the at least one header contained in the packet.

4. The method of claim 1, wherein the at least one predetermined criterion is at least one of: a processing capability of a processing system for processing the first request key and a size of the first request key.

5. The method of claim 4, wherein the size of the first request key is based on a size and number of data fields from which the information is extracted.

6. The method of claim 1, wherein the corresponding search table is a search table including rules that are modified to be searchable on the set of data fields from which the distinct set of information is extracted from the packet.

7. The method of claim 1, the non-final request includes an i-th partial request key and the non-final search result received in response to sending an (i−1)th non-final request, wherein 1<i<n.

8. The method of claim 1, wherein the non-final search result includes a cookie identifying a set of rules in the corresponding search table that matches an i-th partial request key and a next set of the distinct set of information to be matched in a next non-final request, wherein 1<i<n.

9. The method of claim 1, wherein the final search result identifies a rule that includes instructions used to process the packet.

10. An apparatus for processing a data packet, the apparatus comprising:
   a memory; and
   one or more processors coupled to the memory, the one or more processors configured to:
      receive the packet;
      create a first request key using information extracted from the packet;
      split the first request key into an n number of partial request keys if at least one predetermined criterion is met, wherein n>1 and each of the n number of partial request keys is associated with a distinct set of the information extracted from the packet;
      send a non-final request that includes an i-th partial request key to a corresponding search table of an n number of search tables, wherein i<n;
      receive a non-final search result from the corresponding search table; and
      send a final request that includes an n-th partial request key and the non-final search result received in response to sending the non-final request to the corresponding search table;
      receive a final search result from the corresponding search table;
      process the packet based on processing data included in the final search result.

11. The apparatus of claim 10, wherein the packet includes at least one header and the information is extracted from at least one data field of the at least one header.

12. The apparatus of claim 11, wherein the distinct set of information is extracted from data stored in a set of data fields corresponding to a subset of the at least one data field of the at least one header contained in the packet.

13. The apparatus of claim 10, wherein the at least one predetermined criterion is at least one of: a processing capability of a processing system for processing the first request key and a size of the first request key.

14. The apparatus of claim 13, wherein the size of the first request key is based on a size and number of data fields from which the information is extracted.

15. The apparatus of claim 12, wherein the corresponding search table is a search table including rules that are modified to be searchable on the set of data fields from which the distinct set of information is extracted from the packet.

16. The apparatus of claim 10, the non-final request includes an i-th partial request key and the non-final search result received in response to sending an (i−1)th non-final request, wherein 1<i<n.

17. The apparatus of claim 10, wherein the non-final search result includes a cookie identifying a set of rules in the corresponding search table that matches an i-th partial request key and a next set of the distinct set of information to be matched in a next non-final request, wherein 1<i<n.

18. The apparatus of claim 10, wherein the final search result identifies a rule that includes instructions used to process the packet.

* * * * *